United States Patent Office 3,288,599
Patented Nov. 29, 1966

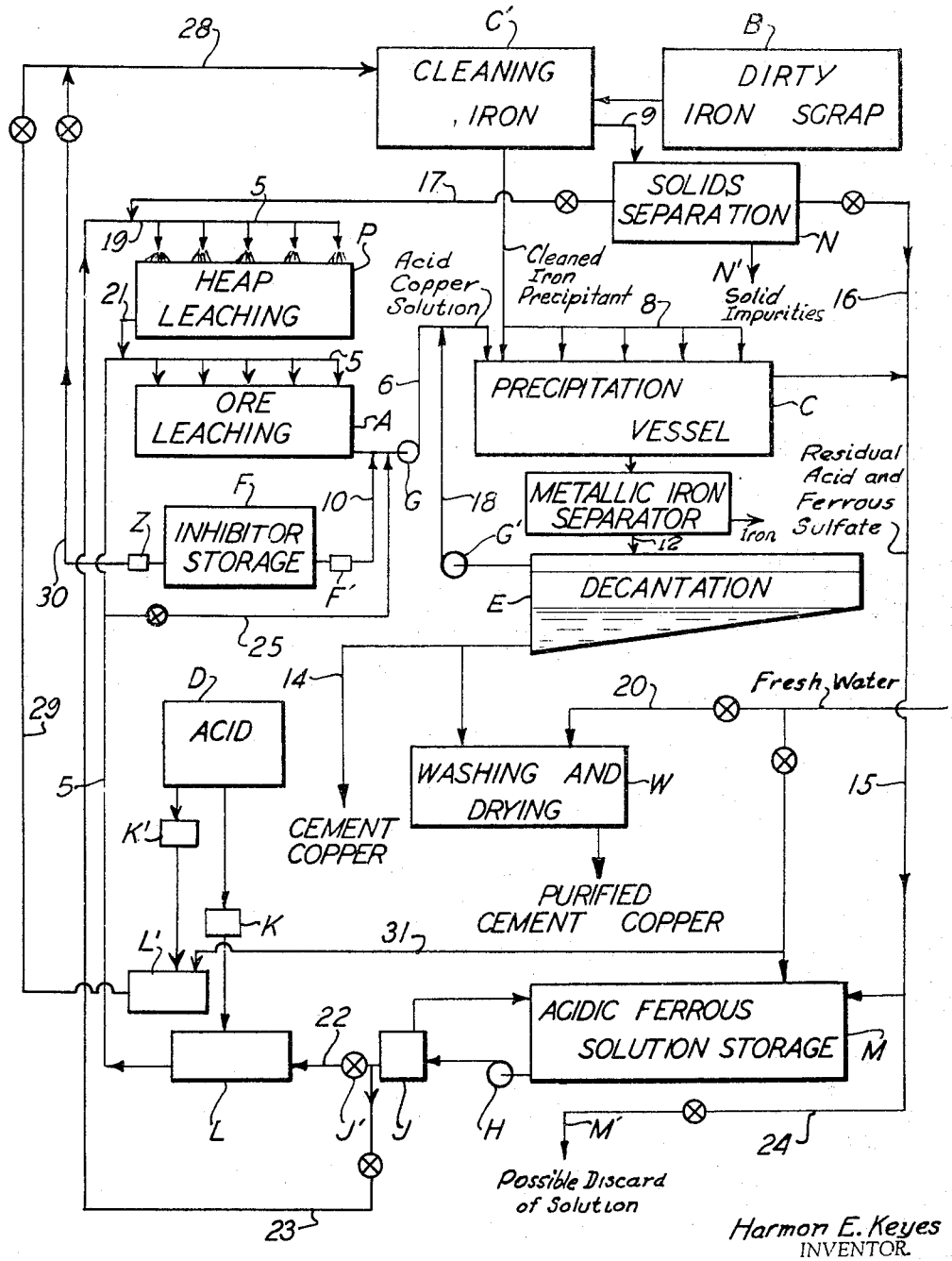

3,288,599
COPPER RECOVERY PROCESS
Harmon E. Keyes, P.O. Box 8, Greer, Ariz.
Filed June 2, 1965, Ser. No. 460,665
8 Claims. (Cl. 75—109)

This application is a continuation-in-part of my application Serial No. 278,260, filed May 6, 1963.

This invention relates to the recovery of copper in metallic form, as a product of a process for extracting copper from an ore, and more particularly to the maximum recovery of high quality metallic copper in finely divided form generally known in the trade as cement copper.

The so-called cement copper is produced by precipitation of metallic copper from an acid solution of a copper salt by a metal which replaces the copper in the solution. Commonly, the copper to be recovered is first obtained as copper sulfate dissolved in aqueous sulfuric acid, commonly known as pregnant solution, and metallic iron is introduced into the acidified pregnant copper solution which usually is at least as concentrated as pH 4. The iron goes into solution as sulfate and the copper precipitates as finely divided metallic copper which is the so-called cement copper.

This invention also embodies a complete process for producing substantially pure copper from copper ore, by leaching with dilute acid or ferric sulfate or both, and precipitating metallic copper by cementation on metallic iron. It is particularly adaptable to heap leaching operations as applied to very low grade ore and it provides for cyclic use of solutions, thus avoiding the problem of waste iron sulfate disposal.

The fundamental reaction involved in the cementation step is:

$$CuSO_4 + Fe = Cu + FeSO_4$$

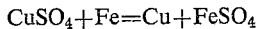

In the absence of impurities, this reaction would result in the production of pure copper. However, in commercial cementation practice some form of dirty iron scrap is generally used as the source of the iron precipitant. The usual impurities are dirt and rust.

A common practice is reclaiming tin cans and preparing by superficial cleaning, burning, and shredding. However, this cleaning as generally practiced is not complete, dirt is often picked up in handling, and exposure to the elements in handling causes rusting. These impurities adhere to the iron and, if not removed, become mixed with the precipitated copper as the iron is dissolved in the cementation reaction.

Other forms of iron scrap that may be used include iron turnings or other iron or steel waste materials. All of these materials are generally in the form of irregular shaped particles and contain impurities in the form of adhering dirt and rust which, if not removed, contaminate the copper precipitated during cementation.

Due to the irregular surfaces of this disseminated iron scrap, particularly the highly wrinkled shapes of the shredded iron, much of these contaminants are occluded to such an extent that, prior to my invention, copper cementation operations did not contemplate production of commercial metallic copper, or copper compounds, directly from cement copper resulting from use of iron scrap as above described. Thus, the accepted practice has been to subject the cement copper to a standard smelting and refining operation and it is treated similar to high grade copper ore. The grade of cement copper produced as in standard practice generally ranges from 50 to 75 percent copper.

The advantages of producing substantially pure copper at the cementation plant have long been realized, as the shipping and treatment costs if sent to a smelter would be greatly increased. Furthermore, a substantially pure copper, such as 99%, offers marked opportunity for added profits by direct conversion to marketable forms of metallic copper or compounds and which may sell at a price substantially above the market price of copper. However, prior to my invention it was not considered that copper of 99% purity or better could be produced directly from the type of metallic iron scrap generally used in cementation.

One of the principal objects of this invention is to provide, in a copper cementation process, a combination of steps whereby the iron content of such dirty iron scrap can be used as the precipitant in the production of cement copper of very high purity, containing 95%, or as high as 99% copper, or better.

This is accomplished, in accordance with my invention, by first subjecting the dirty iron scrap to vigorous agitation, as by tumbling in a rotated drum, in contact with dilute sulfuric acid solution. This action dislodges occluded dirt and rust even from protected surfaces, dissolves adhering rust as ferrous sulfate, and by dissolution and abrasion removes residual tin, thus leaving the metallic iron which, after separating from the solid contaminants, is now in condition to precipitate substantially pure copper.

The cleaned iron is then separated from the acid solution and suspended dirt, and delivered to the cementation step where it is contacted with the acid solution of copper sulfate to cause precipitation of cement copper. In this step sufficient acidity is maintained to prevent oxidation of ferrous sulfate and precipitation of ferric hydroxide.

In commercial practice, the copper solution to be subjected to cementation is generally obtained by leaching copper ore or other copper bearing material with sulfuric acid solution. In accordance with the present invention, the acidic ferrous sulfate solution from the iron cleaning step is preferably utilized by separating therefrom, as by settling or filtering, the suspended solid dirt dislodged from the iron scrap, and utilizing the solution in the leaching of copper ore.

These improvements are particularly applicable to further improvements in heap leaching whereby I employ a truly cyclic process with respect to the solutions and make beneficial use of the waste ferrous sulfate discarded from the iron cleaning and copper cementation steps. By returning this ferrous sulfate, with or without limited sulfuric acid addition, to the older or lower grade heaps which may contain less than 0.3 percent copper, the ferrous sulfate is oxidized by contact with air to ferric sulfate, with some ferric hydroxide precipitated, and the ferric sulfate by hydrolysis precipitates more ferric hydroxide and liberates sulfuric acid which in turn leaches oxidized copper. Also, this ferric sulfate acts to leach copper sulfides. Thus, the solution recovered from the heap, depleted in iron, contains leached copper as sulfate and is added to the cementation circuit. This provides beneficial use of the solution resulting from cleaning the dirty scrap iron with dilute sulfuric acid, as well as the cementation discard solution. Thus, the waste iron solution is used to leach copper ore.

A serious objection to the production of cement copper as heretofore practiced is that there is a large waste of both iron and acid in the copper-acid solution, or a large loss of copper in the ore tailings if complete acid neutralization is attempted during acid leaching of the ore without counter-current action, to the extent that the copper loss and the consumption of acid and iron are economically unsound and from a commercial standpoint render the operation excessively expensive under many conditions.

It is an object of this invention to reduce the loss of iron going into solution and the acid lost by reaction with the iron. It is also an object to improve the recovery of copper from the ore by carrying stronger acid through the ore and into the pregnant solution, and to recover substantially all of the copper from the pregnant solution as metallic copper.

Still another object is to improve the settling and filtering rates of the cement copper sludge, thus lowering its moisture content and cheapening further processing.

A further object is to produce a dense, flaky type of cement copper, which condition is advantageous in some subsequent processing for special purposes. Such copper is readily dislodged from the metallic iron by mild abrasion, as by tumbling in a drum.

I have made the surprising discovery that, by the addition of control agents to the acid solution of the copper to be recovered, at normal ambient temperatures, the consumption of the precipitating metal beyond that required for copper replacement is almost eliminated or at least greatly reduced, and I have further discovered that, at the same time, the copper precipitated reaches an almost maximum degree of purity and percentage recovery. Also, by maintaining adequate minimum acidic conditions, by aid of the control agents during cementation, oxidation of ferrous sulfate is retarded, and hydrolysis and precipitation of basic iron compounds in the precipitator are prevented, thus enhancing the purity of the cement copper. Thus, the precipitated copper may have a purity in excess of 95% purity, such as 99%, and the copper recovery from the solution may be in excess of 98%.

The control agents are in the nature of acid-corrosion inhibitors, for the acids and metals employed. Such corrosion inhibitors are well known in various industries, and there are many of them.

Having reference to sulfuric acid as the acid used in conjunction with cleaned metallic iron to precipitate metallic copper from acid copper sulfate solutions, many appropriate corrosion inhibitors appear generally to be organic compounds and in many instances to contain nitrogenous material and in other instances contain sulfur bearing compounds. For example, I have used bone oil as the inhibitor in precipitating the desired metallic copper from a sulfuric acid solution of copper sulfate with cleaned metallic iron. Bone oil is a well known article of commerce and is obtained by the distillation of bones; its principal effective constituents apparently are derivatives of pyridine, aniline, methylamine and other similar compounds. Cinchone bark alkaloids such as disclosed in U.S. Patent No. 1,742,986, and sulfurized cinchona bark alkaloids such as disclosed in Patent No. 1,908,773 have been known and used for these purposes for many years. Others contain amino and nitrile groups. For example, fatty monamines and diamines are useful, such as $R-NH_2CH_2CH_2CH_2NH_3$ where R represents long hydrocarbon chains from tallow and coconut fatty acids. Other usable inhibitors for this purpose are dialkylthioureas such as 1,3-diethyl and dibutyl-thioureas, these being also useful with hydrochloric acid, phosphoric acid, sulfamic acid, oxalic acid, and so on, according to the manufacturers' instructions. All these are indicated in practice to be highly effective with acid concentrations around 10% and less, when used in amounts of 1% down to about 0.02% of the inhibitor based on the amount of solution by either weight or volume. Generally, they are intended to be used at temperatures under about 160° F., as their effectiveness generally decreases at higher temperatures. However, this invention generally uses inhibitors at ambient or slightly elevated temperatures, and in even lower acid concentrations than just stated.

Also known for these purposes are quinoline, 2,6-dimethyl-quinoline, alpha and beta naphthoquinolines, 1-ethylquinoline, thiourea, methylthiourea, ethylthiourea, and o-, m-, and p-polythioureas.

Corrosion inhibitors for the present purpose, that is acid-corrosion inhibitors to protect iron or other precipitant metal against appreciable consumption by the acid, are agents which do not react chemically with the iron and are not themselves consumed, but nevertheless act to protect the surface of the metal against significant corrosion by the acid. At the same time, I have discovered that the inhibitors do not prevent the replacement of the copper in solution by iron derived from the metallic iron, and in many cases do not retard but in some cases actually promote the deposition of copper by metallic iron.

A discussion of acid corrosion inhibitors is found in "Corrosion Handbook" edited by Dr. Uhlig of Massachusetts Institute of Technology and published in 1948 by John Wiley & Sons. In an article entitled "Inhibitors and Passivators" by Eldredge and Warner (of Shell Development Co. and Carnegie Institute of Technology, respectively) it states with respect to pickling of iron and steel that in recent years, organic type inhibitors have been quite universally used to decrease acid attack in the basis metal without altering the rate of scale removal. I have also discovered that the acid corrosion inhibitors may be used as such without preventing the displacement of copper in solution by iron.

At page 905 these authors state, "Any substance which, when added in small amounts to the corrosive environment of a metal or an alloy, effectively decreases the corrosion rate, is termed an inhibitor."

At page 909, the article goes on to discuss inhibitors more fully, stating, "It seems evident that an organic pickling inhibitor must consist of a hydrocarbon part attached to a polar or ionizable group. In general, they contain nitrogen, oxygen, sulfur, or other elements of the fifth and sixth groups of the Periodic Tables and are compounds such as amines, mercaptans, heterocyclic nitrogen compounds, substituted ureas and thioureas, sulfides, aldehydes, etc."

The article also lists about 150 different inhibitors, the majority of which are considered to be more than 50% effective to protect the basis metal against corrosion. I have used a number of these inhibitors.

The acid-corrosion inhibitor may be introduced directly into the cementation stage for mixing with the acid solution of copper sulfate, or may be fed to and mixed with the copper sulfate solution passing from the leaching stage to the cementation stage. In a preferred embodiment of the invention, however, part or all of the desired amount of the inhibitor is introduced into the iron cleaning stage either separately or mixed with the acid solution delivered to that stage, for the purpose of preventing or reducing acid corrosion and consumption of metallic iron during the cleaning operation. In this preferred embodiment, the acid ferrous sulfate solution delivered from the iron cleaning stage, after separation of the suspended solid impurities and still containing the added inhibitor, is delivered to a copper leaching stage. Thus, the inhibitor added in the iron cleaning stage passes with the solution through the leaching stage and into the cementation step of the process.

I have made the further discovery that acidic iron sulfate solutions from the copper cementation stage and from other stages may be very beneficially recycled from these stages whereby further to use the inhibitor contained therein and also to use the residual acid and iron sulfate, adding make-up acid as need be to reach desired acid strength while at the same time obtaining the same high percentage recovery and purity of copper along with the same conservation of acid and precipitating iron.

Another advantage of my cyclic process is that, if the copper is not precipitated completely during cementation it returns to the ore leaching operation with the ferrous sulfate and any added acid, and emerges with the pregnant solution sent to cementation. This permits a higher concentration of copper in the cementation circuit. Therefore, my process is operative over a wide range of copper precipitation efficiencies.

Other objects and features of this invention will become apparent to those skilled in this art upon reference to the following specification and the accompanying drawings wherein:

The accompanying drawing is a flow sheet illustrating diagrammatically how metallic copper is precipitated from an acid leaching solution of copper by the use of cleaned iron scrap as a base metal in the presence of an acid-corrosion inhibitor, and the precipitated copper is then separated by decantation or equivalent procedure, and also illustrating my complete cyclic process.

In the system indicated, copper is leached from a copper ore, as in a vessel A, or alternatively in one or more ore heaps or waste dumps, through the medium of an appropriate sulfuric acid solution fed by a distributor line 5 from an acid storage tank D as by way of a feeder K and a mixing box L. The acidic copper sulfate solution from this leaching step is passed from the leaching vessel A (or from the ore heap or heaps if used instead of vessel A) by a line 6 and a pump G to a precipitation vessel C into which cleaned iron scrap is supplied as a precipitant.

Dirty iron scrap, such as detinned and shredded tin cans, is delivered from storage B into a cleaning apparatus C' in which it is subjected to vigorous agitation, as by tumbling in a rotated drum, in contact with sulfuric acid solution supplied to the cleaning apparatus, as by means of a valved line 29 and line 28 leading to said apparatus. The acid solution is supplied to line 29 from a mixing box L', to which acid is delivered from storage tank D by feeder K' and water is supplied through a valved water supply line 31. The mixture of iron scrap and acid solution is agitated for sufficient time to dislodge or dissolve substantially all rust contained in the scrap material, forming ferrous sulfate in solution, and to dislodge the dirt therefrom by the strong agitation and abrasive action produced by tumbling.

An acid-corrosion inhibitor such as described above is preferably also introduced into the cleaning apparatus C' from inhibitor storage F, as by feeder Z and valved line 30 leading to the acid supply line 28, in order to inhibit the attack of the iron by the acid solution during the cleaning operation.

The cleaned iron scrap, consisting principally of clean metallic iron, is delivered directly into the precipitation vessel C, as by means of a distributor 8. By delivering the cleaned iron into the precipitation step immediately following the cleaning operation, surface oxidation of the cleaned iron is prevented.

The acidic ferrous sulfate solution, still containing the added inhibitor and carrying the dislodged dirt in suspension, is delivered from the cleaning apparatus C' through line 9 into a filter or other separating apparatus N, for separating the suspended dirt, which is discarded from the process as at N'. The clear ferrous sulfate solution from the separating apparatus N is preferably delivered to a heap leaching step indicated generally at P, as by means of a valved line 17 leading to a distributor line 19.

The term "heap leaching" refers to the treatment of broken or crushed rock or ore in an open pile, dump, or heap. The material must be permeable to leaching solution applied at or near the top surface, as by intermittent flooding, a system of lateral ditches, or by spraying or sprinkling constantly or intermittently. The solution trickles down through the heap and is collected after emerging from open drains at the bottom of the heap. The open texture of the heap provides access of air to the ore or rock and to the downward percolating leaching solution.

In the practice of this invention, the material in heap leaching step P may be virgin ore, marginal grade ore, or mine waste, which contains oxidized copper and may also contain copper sulfide. Or, the material may be leached-out dumps or barren rock. Ferrous sulfate in the solution supplied through line 17 is oxidized by air as it percolates down through the heap, producing ferric sulfate in solution and ferric hydroxide which precipitates. The ferric sulfate is hydrolyzed, precipitating more ferric hydroxide and liberating sulfuric acid. The acid concentration thus produced is quite low, but is sufficient to dissolve many copper oxide minerals. The ferric sulfate formed in the above reactions also reacts with copper sulfide if present in the ore to form copper sulfate in solution. Thus, the solution returned from the iron cleaning step is utilized to leach copper from the ore in the heap leaching step P, while iron is removed from the solution by precipitation as ferric hydroxide.

The weak sulfuric acid solution removed from the bottom of the heap in step P may be delivered by line 21 to the line 5 supplying acid solution to the ore leaching step in vessel or heap A. Thus, copper sulfate extracted from the ore in the heap leaching step P passes through the leaching vessel or heap A into the precipitation vessel C.

It will be seen that the corrosion inhibitor used in the iron cleaning step at C' passes along with the solution through the separating apparatus N, the heap leaching step P, and the leaching vessel or heap A, and thence into the precipitation vessel C.

Additional acid-corrosion inhibitor may be fed from inhibitor storage F, as by means of a feeder F' and a line 10, to the pump G and line 6 to be mixed with the copper solution passing to the precipitation vessel C. In the vessel C, the copper of the solution delivered from the leaching vessel or heap A is precipitated on the cleaned iron scrap in the presence of the acid and the inhibitor. After an appropriate period of time, which may vary, for example, from less than one-half hour to ten hours or more, according to plant conditions, the undissolved scrap iron is agitated, as by tumbling, to dislodge the precipitated copper which, under these conditions, is a granular copper that will readily pass out with the solution from the residual iron in the vessel C.

Part of the solution, carrying the precipitated copper in suspension, is delivered from vessel C to an apparatus R for separating from the copper any fine metallic iron, such as a screen, magnetic separator, or any other suitable means; and then passes through line 12 into an underlying decantation vessel E in which it will settle and drain rapidly. The reclaimed fine iron from separator R is returned to the copper cementation stage in vessel C.

Since the precipitated or "cement" copper may also be readily filtered at this stage, the vessel E may also include a filter. In either event, the purified copper thus recovered may be either passed to washing and drying apparatus W or directly recovered at 14 for disposition as the product of the procedure.

As illustrated, the residual acid and ferrous sulfate solution in the precipitation vessel C after removal of the precipitated copper is drawn by a line 15 to an acidic ferrous sulfate solution storage M for further use, since the residual acid and the inhibitor still have much value. If desired, acidic ferrous sulfate solution from the solids separator N (usually containing inhibitor) may also be passed by a valved line 16 to the line 15 and to storage M. In a somewhat similar manner, the smaller volume of solution from the decanter E (or filter) may later be pumped by a pump G' through a line 18 to the copper solution line 6 to mix with a new copper solution batch to be treated in the precipitation vessel C. Use of the stored residual acid and inhibitor solution in storage M is made as required. Thus, it may be diluted from a branched valved fresh water line 20 which may supply also the washer W. This solution is fed for use as by a pump H to a circulating control box J or the like, whence the solution, or a portion of it, is delivered through a regulating valve J', and a line 22 to the previously mentioned mixing box L which is supplied with fresh acid from the acid storage D by the feeder K.

Occasionally, if accumulations of sodium, magnesium, or potassium should be dissolved from the ore and concentrate unduly in the recycled solutions, limited amounts of the residual solution from the cementation step may be discarded through a valved line 24, as indicated at M'.

The acid line 5, which supplies the leaching apparatus A, may feed a valved branch line 25 leading to the copper solution line 6 for the purpose of fortifying the copper solution to provide adequate pH value for the copper precipitation stage in the precipitation vessel C.

In case the residual acid and ferrous sulfate solution removed from the precipitation vessel C contains an appreciable amount of dissolved copper due to incomplete precipitation, the system described above provides for the return of this copper with the solution through storage M and thence to the precipitation vessel for further treatment and recovery.

A portion of the dilute acidic solution of ferrous sulfate from storage M is delivered through a valved line 23 to the distribution line 19 for the heap leaching step P, to provide for leaching of copper from the ore and precipitation of iron from the solution, as ferric hydroxide, in the same manner as described above in connection with the solution from the iron cleaning step.

Concerning concentrations of the various constituents involved, as to copper concentrations obtained in copper solutions prepared commonly by the ore-leaching procedures above indicated and similar procedures, the copper content usually may be considered low, such as 0.1% to 1% copper calculated as metal. However, much greater copper contents do not in any way hinder the functioning of the present processes.

Respecting the sulfuric acid content of the final pregnant solution going to precipitation, this usually need not exceed about one-fourth (by weight) of the copper content. It may, however, be more. Control of the acid content probably is best effected through regulation of the pH value during precipitation, which should be between about pH 1.4 and pH 3, such as about pH 2.5, for optimum operating conditions in precipitating metallic copper with the base metal such as iron. Greater acidity is ordinarily acceptable when an inhibitor is used as described above, such as pH 1.4 or less (numerically), because appreciable free acid, as later defined, is maintained in the copper cementation step to avoid the precipitation of iron compounds (iron hydroxide, for example, as mentioned below) and to yield the high purity, particle coarseness and granular characteristics desired in the recovered precipitated or cement copper product. Acid may also be computed on the basis of grams per liter. For example, a pH value of 2.5 is reached with .15 gram per liter of sulfuric acid (assuming 100% ionization) amounting to about .015% (by weight) of the overall solution. However, in view of the presence of acid-corrosion inhibitor to protect against excess solution of the iron precipitant, higher precentages such as up to about 5% by weight of the overall solution might be used if desired for any reason, although normally an acid content of above 0.25% (about 1.3 pH) will offer no particular additional advantage in copper precipitation and may in some cases unduly increase costs by unnecessarily high acid loads in the various parts of the system. An initial acidity such as pH 2.5 to pH 2.0 that will not reduce below about pH 3.5–4 at the end, unless make-up acid is to be added during the copper precipitation, will be preferable. The initial acidity is established to maintain this minimum under conditions encountered, and the acidity drops but little in the precipitation procedure because of the presence of the inhibitor which conserves the acid.

The amount of iron supplied to the precipitation stage is necessarily that which is thoroughly adequate to precipitate practically all the copper. This should be at least somewhat more than on an aliquot parts basis, i.e., an "excess" of iron.

The concentration of the inhibitor to be used in the precipitation stage is very small, whether of the non-frothing type or the frothing type. Thus, the inhibitor may be less than about 0.5% of the copper solution, or within a range of about 0.005% to 0.5% based on the acidified copper solution bath. There appears to be nothing critical about the proportions of inhibitor (as is also true of the other constituents employed) and often larger or smaller concentrations may be employed effectively. One pound of inhibitor per ton of solution (0.05%) is commonly quite acceptable, but any smaller effective proportion may be used. Similarly, much larger proportions may be used, such as 4 or 5 pounds per ton; but since these usually offer no added advantage, such larger amounts merely increase the cost. In any event, the optimum proportion of inhibitor varies from one to another and can ordinarily be ascertained for each inhibitor from information supplied by the manufacturer of the inhibitor.

Pregnant copper solutions suitable for delivery to precipitation vessel C for precipitation of copper, may and often do contain iron as sulfate in the ferrous or ferric state or both. In contact with metallic iron, the ferric iron is quickly reduced to ferrous and metallic iron is dissolved in the reduction reaction. This occurs before much copper is precipitated since ferric sulfate also dissolves cement copper readily, also reducing the ferric iron to ferrous.

Ferrous sulfate thus formed may be oxidized by air to the ferric state in the precipitation vessel C. This oxidation is retarded by the presence of free acid, greater acidity having a greater retarding effect. Hence, the presence of acid in the precipitation step tends to prevent oxidation of iron at this stage. Such oxidation of ferrous sulfate also uses up acid since $2FeSO_4$ going to $Fe_2(SO_4)_3$ requires an extra sulfate radical obtained from the acid present. Without free acid present, oxidation of ferrous sulfate by air produces some ferric hydroxide that precipitates and may carry with it considerable iron sulfate. The ferric sulfate produced reacts with the metallic iron, as stated before, to produce more ferrous sulfate which is in turn oxidized by air to produce more ferric hydroxide. It is advantageous to insure the presence of free acid corresponding to a pH value of 2 or less (i.e., .49 gram per liter or more of acid) to retard such oxidation and prevent precipitation of ferric hydroxide, however, the minimum acidity required to obtain these results is in the vicinity of pH 3.5–4.0. One of the advantages of my invention is the elimination of ferric sulfate and ferric hydroxide. The former would use up iron, and the latter would contaminate the cement copper requiring subsequent processing to remove it and obtain copper of high purity.

The concentration of acid, and of inhibitor if used, in the solution delivered through line 28 to the iron cleaning stage C' is not very critical. For example, this solution may contain from 0.5% to 5.0% sulfuric acid by weight. When an acid-corrosion inhibitor is used in this stage, the concentration of inhibitor may be between about 0.02% and 1.0% by weight of the solution, the optimum proportion varying somewhat with different inhibitors.

As another example of the foregoing procedures, a copper ore is leached with a solution containing originally approximately 10 grams per liter (1.0% by weight) of sulfuric acid, producing a pregnant solution containing about 0.3% to 0.5% copper in the form of copper sulfate and 0.5 gram per liter (0.05% by weight) of sulfuric acid. Detinned and shredded tin cans are cleaned by tumbling in a solution containing 10 grams per liter (1.0% by weight) of sulfuric acid and 0.1% by weight of an inhibitor such as bone oil, after which the cleaned iron is separated from the cleaning solution. The pregnant acid solution of copper sulfate is brought into contact with cleaned iron precipitant in the presence of an inhibitor such as bone oil in the amount of 2 lbs./ton of solution (0.1% by weight). The weight of iron present is at least ten times the weight of copper in the pregnant solution in order to provide a desired excess. An ambient temperature of 65°–70° F., the solution is kept in contact with the cleaned iron for four hours. The copper precipitate is then detached from the iron by agitating the mass, and the cement copper is removed from the residual metallic and dissolved iron along with residual acid solution. The cement copper is then drained, washed with water, and dried. The above procedure has been found to provide a copper recovery of 98 to 99% or more of the copper, and to produce a dried product containing in excess of 95% copper. When this product is heated to dull redness and cooled, both in an inert atmosphere such as natural gas, a final product having a purity in excess of 98% metallic copper such as 99.2% may be obtained. In case copper cementation is conducted in a rotated drum, the time of precipitation may be reduced to approximately 30 minutes or less.

As examples of the effectiveness of inhibitors at high acid concentrations in the copper cementation stage, the following test data are given:

Test A was with bone oil and Test B was with "Grasselli Inhibitor No. 8" which is a sulfurized cinchona bark alkaloid (see Patent No. 1,908,773). Both inhibitors were at a concentration of .42 lb. per ton of solution or .021%. The original copper solution contained 8.35 grams per liter of $H_2SO_4$ and 12.80 grams per liter of Cu. All values below are in grams per liter.

TABLE I

| Test | Time, hours | Control—No Inhibitor | | | Inhibited Solution | | |
|---|---|---|---|---|---|---|---|
| | | $H_2SO_4$ | Fe | Cu | $H_2SO_4$ | Fe | Cu |
| A | 2 | 5.5 | 13.1 | .063 | 7.4 | 12.1 | .063 |
| B | 2½ | 2.3 | 15.1 | tr. | 6.6 | 12.6 | tr. |

These figures show that starting with 8.35 grams per liter of acid, in the inhibited solutions only 10.2% and 21% of the acid was consumed in tests A and B respectively, while in the control solutions 34% and 72% of the acid was consumed under comparable conditions. Hence, the acid saving is demonstrated, and it is also shown that the inhibitors are effective at higher acidity than normally used, and without preventing precipitation of copper.

Some care is required to interpret properly the above data with respect to iron savings (or loss) since the influence of the iron consumed by the copper masks the effectiveness of the inhibitor in this respect. The iron consumption by the acid is stoichiometrically equal to $56/98$ times the acid loss. This can be relied on under this procedure. The theoretical loss or result can be compared directly to the iron loss determined by the test when, as here, the copper precipitation is of approximately the same amount. Therefore, the weight of iron saved is equal to $56/98$ times the weight of acid saved. Comparison of calculated and actual values based on tests A and B above are provided by the following table.

TABLE II

| Test | Acid Saved, gm./l. | Iron Saved, Calculated | Gm./l. Actual |
|---|---|---|---|
| A | 2.0 | 1.14 | 1.0 |
| B | 4.3 | 2.46 | 2.5 |

The theoretical minimum consumption of iron by replacing copper is approximately $56/63$ or 0.89 gm. of metallic iron consumed for each gm. of copper precipitated. The comparable iron consumption in tests A and B above is shown in Table III in terms of the ratio $$\frac{\text{Grams of iron dissolved}}{\text{Grams of copper precipitated}}$$

TABLE III

| Test | Control—No Inhibitor | Inhibited Solution |
|---|---|---|
| A | 1.03 | .95 |
| B | 1.18 | .98 |

One of the observed advantages with the inhibitors, especially the sulfurized cinchona bark alkaloid, is that the copper is precipitated copper and is in a dense, bright, flaky form easily dislodged from the iron by mild agitation effected by tumbling in a drum.

The cyclic process of this invention is particularly advantageous when applied in connection with heap leaching, preferably using several different heaps in simultaneous operation. In such cases, I generally maintain sufficient strength of acid in leaching the newer heaps, as at A, to effect the desired leaching rate in these heaps and to provide sufficient free acid to prevent precipitation of ferric hydroxide during leaching and in the subsequent cementation stage. The cementation effluent solution and, preferably, the acidic ferrous sulfate solution from the iron cleaning step, are then added to a separate heap or heaps, as at P, which may be of lower grade or even negligible grade in copper and not a principal factor in copper production rate. In this latter operation, only a relatively low or minimum acidity is maintained, so as to promote the above described reactions of oxidation, hydrolysis, and precipitation of iron as ferric hydroxide in the heap, together with leaching of copper. Thus, iron is continually eliminated and kept in balance in the system, the waste ferrous sulfate is converted to leaching solution, and any inhibitors in the solutions are returned to the precipitation circuit.

The following example illustrates this procedure: A main leaching charge consists of a heap of copper ore containing 0.5% copper as oxide and 0.15% copper as chalcocite which is a simple form of copper sulfide. An oxidizing heap containing 0.15% copper as oxide and 0.10% copper as sulfide is operated to remove iron from the system and extract additional copper. The solution added to the main leaching circuit contains 2.0% sulfuric acid, 1.5% iron as ferrous sulfate and 0.02% copper as sulfate. The effluent pregnant solution delivered to the cementation circuit contains 0.8% copper and 0.1% sulfuric acid which is sufficient acidity to prevent precipitation of ferric hydroxide and corresponds to a pH of approximately 2.0 or less. The solution from the copper cementation and iron cleaning stages contains 2.5% iron as ferrous sulfate and 0.1% free sulfuric acid. This solution, added to the oxidizing heap, results in an effluent containing 1.6% iron, 0.2% copper and having a pH of approximately 3.7 or more, which permits precipitation of ferric hydroxide in the oxidizing heap. It is understood that addition of make-up water at various points will change the above figures somewhat but without altering the general relationships which provide for leaching in a main circuit at any desired acidity and thus preventing iron precipitation at that stage, while sending a portion of the iron solution effluents from iron cleaning and copper cementation to an oxidizing heap in which excess iron is precipitated and acidic leaching solvent regenerated. This system also provides for beneficial use of the iron sulfate effluent solution from iron cleaning, thus permitting a highly cleaned metallic iron which produces exceptionally high grade cement copper.

Under some conditions of leaching, the free acid in the pregnant copper solution going to precipitation may be too low to establish the desired conditions for my process, if the acid is partially or substantially neutralized during ore leaching. In such cases, I add sulfuric acid in a quantity sufficient to raise the acidity to within the approximate range of pH 2.7 to 1.4 (about .10–2.0 grams per liter of $H_2SO_4$ respectively). This degree of acidity attains the advantages of my process. Inhibitor is added at a suitable time.

I claim:

1. In a process of producing metallic copper, the steps which comprise:

leaching a copper ore with sulfuric acid solution to produce a pregnant solution containing copper sulfate and sulfuric acid;

cleaning iron scrap containing dirt and rust by subjecting it to vigorous agitation in contact with a dilute sulfuric acid solution to remove adhering dirt and dissolve rust as ferrous sulfate;

separating the resulting acidic ferrous sulfate solution and the removed dirt from the cleaned iron;

passing said acidic ferrous sulfate solution downwardly through and in contact with a permeable heap of broken rock exposed to the air to remove iron from the solution by precipitation as ferric hydroxide and to produce sulfuric acid in the solution, by reactions involving oxidation and hydrolysis, while maintaining a relatively low acidity in the solution in contact with said heap so as to promote said reactions and the removal of iron from the solution;

adding the effluent solution from the last-mentioned step, depleted in iron and containing sulfuric acid, to the sulfuric acid solution in the leaching step, while maintaining in the solution during said leaching step an acidity higher than that in the solution in contact with said heap and sufficient to prevent precipitation of ferric hydroxide;

subjecting the cleaned iron to contact with the pregnant solution from the leaching step to precipitate metallic copper and produce ferrous sulfate in solution, while maintaining sufficient free acid in the solution to prevent precipitation of iron hydroxide;

separating the precipitated copper from the remaining iron and from the residual acid solution containing ferrous sulfate;

returning a portion of said residual solution and passing it downwardly through and in contact with said heap of broken rock to remove iron therefrom as ferric hydroxide and produce sulfuric acid in the solution;

and adding sulfuric acid to another portion of said residual solution and returning it to the leaching step.

2. In a process of producing metallic copper, the steps as set forth in claim 1, in which the solution delivered to the copper precipitation step contains an organic acid-corrosion inhibitor to inhibit attack of the acid on the cleaned iron, and said inhibitor is returned along with the residual solution and thus returned to the copper precipitation step.

3. In a process of producing metallic copper, the steps which comprise:

leaching a copper ore with sulfuric acid solution to produce a pregnant solution containing copper sulfate and sulfuric acid;

cleaning iron scrap containing dirt and rust by subjecting it to vigorous agitation in contact with a dilute sulfuric acid solution to remove adhering dirt and dissolve rust as ferrous sulfate;

separating the resulting acidic ferrous sulfate solution and the removed dirt from the cleaned iron;

passing said acidic ferrous sulfate solution downwardly through and in contact with a permeable heap of broken ore exposed to air and containing copper mineral, to remove iron from the solution by precipitation as ferric hydroxide and produce sulfuric acid in the solution by reactions involving oxidation and hydrolysis, and to dissolve copper as copper sulfate from said copper mineral, while maintaining a relatively low acidity in the solution in contact with said heap so as to promote said reactions and the removal of iron from the solution;

adding the effluent solution from the last-mentioned step, depleted in iron and containing copper sulfate, to the sulfuric acid solution in the leaching step, while maintaining in the solution during said leaching step an acidity higher than that in the solution in contact with said heap and sufficient to prevent precipitation of ferric hydroxide;

subjecting the cleaned iron to contact with the pregnant solution from the leaching step to precipitate metallic copper and produce ferrous sulfate in solution, while maintaining sufficient free acid in the solution to prevent precipitation of iron hydroxide;

separating the precipitated copper from the remaining iron and from the residual acid solution containing ferrous sulfate;

returning a portion of said residual solution and passing it downwardly through and in contact with said heap of broken ore to remove iron therefrom as ferric hydroxide, produce sulfuric acid in the solution, and dissolve copper as copper sulfate from said copper mineral;

and adding sulfuric acid to another portion of said residual solution and returning it to the leaching step.

4. In a process of producing metallic copper, the steps which comprise:

leaching a copper ore with sulfuric acid solution to produce a pregnant solution containing copper sulfate and sulfuric acid;

subjecting said pregnant solution to contact with metallic iron to precipitate metallic copper and produce ferrous sulfate in solution, while maintaining sufficient free acid in the solution to prevent precipitation of iron hydroxide;

separating the precipitated copper from the remaining iron and from the residual acid solution containing ferrous sulfate;

passing a portion of said residual solution downwardly through and in contact with a permeable heap of broken ore exposed to air and containing copper mineral, to remove iron from the solution by precipitation as ferric hydroxide and produce sulfuric acid in the solution by reactions involving oxidation and hydrolysis, and to dissolve copper as copper sulfate from said copper mineral, while maintaining a relatively low acidity in the solution in contact with said heap so as to promote said reactions and the removal of iron from the solution;

adding the effluent solution from the last-mentioned step, depleted in iron and containing copper sulfate, to the sulfuric acid solution in said leaching step while maintaining in the solution during said leaching step an acidity higher than that in the solution in contact with said heap and sufficient to prevent precipitation of ferric hydroxide;

and adding sulfuric acid to another portion of the residual solution from the copper precipitation step and delivering said portion of the solution to a leaching step.

5. In a process of producing metallic copper, the steps which comprise:

leaching a copper ore with sulfuric acid solution to produce a pregnant solution containing copper sulfate and sulfuric acid;

subjecting said pregnant solution to contact with metallic iron to precipitate metallic copper and produce ferrous sulfate in solution, while maintaining sufficient free acid in the solution to prevent precipitation of iron hydroxide;

separating the precipitated copper from the remaining iron and from the residual acid solution containing ferrous sulfate;

passing at least the major portion of said residual solution downwardly through and in contact with a permeable heap of broken copper ore exposed to air and having a lower copper content than the copper ore in the aforesaid leaching step, to remove iron from the solution by precipitation as ferric hydroxide and produce sulfuric acid by reactions involving oxidation and hydrolysis, and to dissolve copper sulfate from said copper ore, while maintaining a relatively low acidity in the solution in contact with said heap so as to promote said reactions and the removal of iron from the solution;

and adding the effluent solution from the last-mentioned step, depleted in iron and containing copper sulfate, to the sulfuric acid solution in said leaching step, while maintaining in the solution during said leaching step an acidity higher than that in the solution in contact with said heap and sufficient to prevent precipitation of ferric hydroxide.

6. In a process of producing metallic copper, the steps which comprise:

leaching a copper ore with sulfuric acid solution to produce a pregnant solution containing copper sulfate and sulfuric acid;

subjecting said pregnant solution to contact with metallic iron to precipitate metallic copper and produce ferrous sulfate in solution, while maintaining sufficient free acid in the solution to prevent precipitation of iron hydroxide;

separating the precipitated copper from the remaining iron and from the residual acid solution containing ferrous sulfate;

passing at least the major portion of said residual solution downwardly through and in contact with a permeable heap of broken rock exposed to the air, to remove iron from the solution by precipitation as ferric hydroxide by reactions involving oxidation and hydrolysis, while maintaining a relatively low acidity in the solution in contact with said heap so as to promote said reactions and the removal of iron from the solution;

and adding the effluent solution from the last-mentioned step, depleted in iron, to the sulfuric acid solution in the leaching step, while maintaining in the solution during said leaching step an acidity higher than that in the solution in contact with said heap and sufficient to prevent precipitation of ferric hydroxide.

7. In a process of producing metallic copper, the steps which comprise:

leaching a copper ore with sulfuric acid solution to produce a pregnant solution containing copper sulfate and sulfuric acid;

cleaning iron scrap containing dirt and rust by subjecting it to vigorous agitation in contact with a dilute sulfuric solution to remove adhering dirt and dissolve rust as ferrous sulfate;

separating the resulting acidic ferrous sulfate solution and the removed dirt and dissolved rust from the cleaned iron;

passing said acidic ferrous sulfate solution downwardly through and in contact with a permeable heap of broken rock exposed to the air to remove iron from the solution by precipitation as ferric hydroxide and to produce sulfuric acid in the solution, by reactions involving oxidation and hydrolysis, while maintaining a relatively low acidity in the solution in contact with said heap so as to promote said reactions and the removal of iron from the solution;

adding the effluent solution from the last-mentioned step, depleted in iron and containing sulfuric acid, to the sulfuric acid solution in the leaching step, while maintaining in the solution during said leaching step an acidity higher than that in the solution in contact with said heap and sufficient to prevent precipitation of ferric hydroxide;

subjecting the cleaned iron to contact with the pregnant solution from the leaching step to precipitate metallic copper and produce ferrous sulfate in solution, while maintaining sufficient free acid in the solution to prevent precipitation of iron hydroxide;

and separating the precipitated copper from the remaining iron and from the residual solution.

8. In a process of producing metallic copper, the steps which comprise:

leaching a copper ore with sulfuric acid solution to produce a pregnant solution containing copper sulfate and sulfuric acid;

cleaning iron scrap containing dirt and rust by subjecting it to vigorous agitation in contact with a dilute sulfuric acid solution containing an organic acid-corrosion inhibitor, to remove adhering dirt and dissolve rust as ferrous sulfate, while inhibiting attack of the acid on the metallic iron of the scrap;

separating the cleaned iron from the resulting acidic ferrous sulfate solution containing said inhibitor and from the removed dirt;

passing said ferrous sulfate solution containing said inhibitor downwardly through and in contact with a permeable heap of broken rock exposed to the air, to remove iron from the solution by precipitation as ferric hydroxide and to produce sulfuric acid in the solution by reactions involving oxidation and hydrolysis, while maintaining a relatively low acidity in the solution in contact with said heap so as to promote said reactions and the removal of iron from the solution;

adding the effluent solution from the last-mentioned step, depleted in iron and containing sulfuric acid together with said inhibitor, to the sulfuric acid solution in the leaching step, while maintaining in the solution during said leaching step an acidity higher than that in the solution in contact with said heap and sufficient to prevent precipitation of ferric hydroxide;

subjecting the cleaned iron to contact with the pregnant solution from the leaching step containing said inhibitor, to precipitate metallic copper and produce ferrous sulfate in solution and to inhibit attack of the acid on the cleaned iron, while maintaining sufficient free sulfuric acid in the solution to prevent precipitation of iron hydroxide;

and separating the precipitated copper from the remaining iron and from the residual solution.

References Cited by the Examiner

UNITED STATES PATENTS

| | | | |
|---|---|---|---|
| 129,417 | 7/1872 | McDaniel et al. | 75—109 |
| 1,568,464 | 4/1925 | Neill | 75—109 |
| 1,723,411 | 8/1929 | Dossmann | 75—98 |
| 2,009,667 | 7/1935 | Keyes | 23—311 |
| 2,083,031 | 6/1937 | Maclennan | 75—109 |
| 2,130,278 | 9/1938 | Keyes | 75—109 |
| 2,158,992 | 5/1939 | Cook | 134—3 |
| 2,618,577 | 11/1952 | Bash | 134—25 |
| 2,801,979 | 8/1957 | Hager et al. | 134—41 |
| 2,842,436 | 7/1958 | Dasher et al. | 75—117 |
| 3,114,657 | 12/1963 | Stilwell | 134—3 |
| 3,117,000 | 1/1964 | Schlain et al. | 75—117 |
| 3,135,632 | 6/1964 | Lucas et al. | 134—41 |
| 3,164,463 | 1/1965 | Graham et al. | 75—108 |
| 3,194,653 | 7/1965 | Keyes | 75—117 |

DAVID L. RECK, *Primary Examiner.*

N. F. MARKVA, *Assistant Examiner.*

UNITED STATES PATENT OFFICE
CERTIFICATE OF CORRECTION

Patent No. 3,288,599            November 29, 1966

Harmon E. Keyes

It is hereby certified that error appears in the above numbered patent requiring correction and that the said Letters Patent should read as corrected below.

Column 13, line 57, for "sulfuric solution" read -- sulfuric acid solution --.

Signed and sealed this 20th day of May 1969.

(SEAL)
Attest:

Edward M. Fletcher, Jr.
Attesting Officer

Commissioner of Patents